(12) United States Patent
Suresh et al.

(10) Patent No.: US 10,380,077 B2
(45) Date of Patent: Aug. 13, 2019

(54) SYSTEM AND METHOD FOR UPLOAD AND SYNCHRONIZATION OF MEDIA CONTENT TO CLOUD BASED MEDIA SERVICES

(71) Applicant: ITTIAM SYSTEMS PTE. LTD., Singapore (SG)

(72) Inventors: Deepa Suresh, Bangalore (IN); Mukund Srinivasan, Bangalore (IN)

(73) Assignee: ITTIAM SYSTEMS PTE. LTD., Singapore (SG)

( * ) Notice: Subject to any disclaimer, the term of this patent is extended or adjusted under 35 U.S.C. 154(b) by 362 days.

(21) Appl. No.: 14/207,730

(22) Filed: Mar. 13, 2014

(65) Prior Publication Data

US 2014/0304225 A1    Oct. 9, 2014

(30) Foreign Application Priority Data

Apr. 8, 2013    (IN) .......................... 1597/CHE/2013

(51) Int. Cl.
| | | |
|---|---|---|
| G06F 16/00 | (2019.01) | |
| G06F 7/00 | (2006.01) | |
| G06F 16/182 | (2019.01) | |
| G06F 16/178 | (2019.01) | |

(52) U.S. Cl.
CPC ........ *G06F 16/1824* (2019.01); *G06F 16/178* (2019.01)

(58) Field of Classification Search
CPC ......... G06F 17/30575; G06F 17/30286; G06F 17/30067; G06F 17/30008; H04L 29/0854
USPC ........................................................ 707/610
See application file for complete search history.

(56) References Cited

U.S. PATENT DOCUMENTS

| | | | | |
|---|---|---|---|---|
| 8,929,441 | B2 * | 1/2015 | Ma ................... | H04N 21/44209 375/240.1 |
| 2008/0162713 | A1 * | 7/2008 | Bowra ............... | H04N 21/4344 709/231 |
| 2010/0195521 | A1 * | 8/2010 | Wanstedt ............... | H04L 47/10 370/252 |
| 2011/0191577 | A1 * | 8/2011 | Tian ......................... | H04L 9/00 713/150 |
| 2011/0211812 | A1 * | 9/2011 | Tzoukermann .... | H04N 7/17318 386/250 |
| 2011/0231569 | A1 * | 9/2011 | Luby ................ | H04N 21/23106 709/234 |
| 2011/0246937 | A1 * | 10/2011 | Roberts ................ | G11B 27/034 715/810 |
| 2012/0102154 | A1 * | 4/2012 | Huang .................. | H04L 65/605 709/219 |
| 2013/0254326 | A1 * | 9/2013 | Weng .................. | H04L 67/1097 709/215 |
| 2014/0165120 | A1 * | 6/2014 | Losev .............. | H04N 21/47202 725/97 |

* cited by examiner

*Primary Examiner* — Usmaan Saeed
*Assistant Examiner* — Raquel Perez-Arroyo
(74) *Attorney, Agent, or Firm* — Prakash Nama; Global IP Services, PLLC

(57) ABSTRACT

A system and method for upload and synchronization of media content captured by an electronic device to a cloud based media service are disclosed. In one embodiment, the captured media content is partitioned into multiple media segments by the electronic device. Further, the multiple media segments are uploaded and synchronized to the cloud based media service via a cloud based sharing service in the electronic device.

14 Claims, 2 Drawing Sheets

SYSTEM AND METHOD FOR UPLOAD AND SYNCHRONIZATION OF MEDIA CONTENT TO CLOUD BASED MEDIA SERVICES

Benefit is claimed under 35 U.S.C 119(a) to Indian Provisional Patent Application Ser. No 1597/CHE/2013 entitled "System and method for efficient upload and sync of media content in cloud storage for efficient transcoding" by Ittiam Systems Pte. Ltd. filed on Apr. 8, 2013.

FIELD OF TECHNOLOGY

Embodiments of the present invention relate to processing of media content for cloud based media services. More particularly, embodiments of the present invention relate to upload and synchronization of the media content to the cloud based media services.

BACKGROUND

Existing cloud based media services are typically used for storing media content by organizations and individuals and then distributing the stored media content to one or more end-users. The uploaded media content may be transcoded and/or re-purposed to multiple formats before distributing the media content to one or more end-users. However, for paid cloud based media services, cost of upload may exceed cost of the cloud based media services as the upload of the media content may require a higher bandwidth. Further, for free cloud based media services, the upload time determines turn-around time for the cloud based media services which may affect live streaming services and may result in poor end-user experience, in the absence of a high bandwidth connection.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method for upload and synchronization of media content to cloud based media services are disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
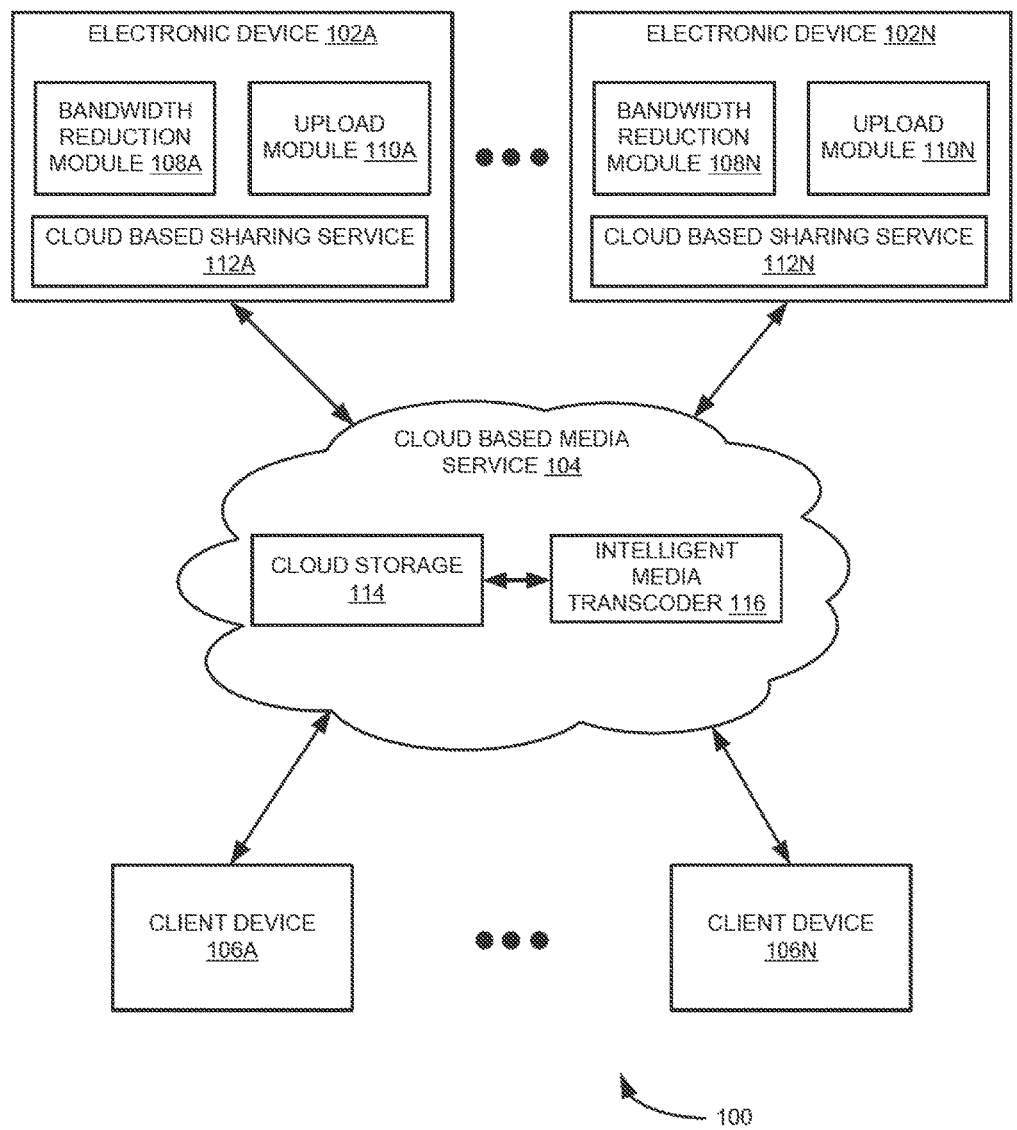
FIG. 1 illustrates a block diagram of a system for upload and synchronization of media content to a cloud based media service, according to one embodiment.

FIG. 1 illustrates a block diagram of a system 100 for upload and synchronization of media content to a cloud based media service 104. As shown in FIG. 1, the system 100 includes a plurality of electronic devices 102A-N, the cloud based media service 104 and a plurality of client devices 106A-N. The electronic devices 102A-N may include devices, such as tablets, smart phones, personal computers, laptops, cameras and the like having Internet connectivity and imaging or recording capabilities. The electronic devices 102A-N can be in same or different geographical co-ordinates.

Further, the electronic devices 102A-N include associated bandwidth reduction modules (BRMs) 108A-N, upload modules 110A-N and cloud based sharing services 112A-N. Example cloud based sharing service includes a network file storage (NFS) service, such as Google Drive™, Dropbox™, Sky Drive™ and the like. Furthermore, the cloud based media service 104 includes a cloud storage 114 and an intelligent media transcoder 116. In addition, the electronic devices 102A-N are communicatively coupled to the cloud based media service 104. Also, the cloud based media service 104 is communicatively coupled to the client devices 106A-N.

In operation, each of the electronic devices 102A-N captures same or different media content. For example, the media content includes audio streams, speech, images, video streams, graphics and the like. Further, the associated one of the BRMs 108A-N partitions the captured media content into multiple media segments. In one embodiment, the associated one of the BRMs 108A-N partitions the media content into the multiple media segments based on parameters including logical cue points, duplication of media content, a size of media content allowed for available bandwidth, scene transition, location based information, media content where there is no motion and the like. The location based information may include information about what end-users associated with the client devices 106A-N are watching at a particular time. The logical cue points can be automatically selected or referenced by a user.

In one example implementation, the associated one of the BRMs 108A-N then encodes the media segments. In another example implementation, the associated one of the BRMs 108A-N then converts one or multiple media segments into a lower bit-rate coded representation. For example, the lower bit-rate coded representation is a scalably coded representation including a plurality of media resolutions and/or a plurality of bit-rates. In this example implementation, the associated one of the BRMs 108A-N converts the media segments to the lower bit-rate coded representation using processing steps including processing the media segments and/or transcoding the media segments. For example, the associated one of the BRMs 108A-N converts the media segments into the lower bit-rate coded representation based on parameters, such as properties of the media segment, bandwidth available for the upload, computing capabilities of an electronic device, power and battery life requirements of an electronic device, cloud based media service requirement, live or stored processing requirement, and end-user experience requirement.

In yet another example implementation, the associated one of the BRMs 108A-N then scales the media segments according to resolution requirements of the cloud based media service 104, converts frame-rate of the media segments according to the frame-rate requirements of the cloud based media service 104, removes noise from the media segments or selectively smoothing details in a visually pleasing manner to improve its compressibility, and/or deinterlaces any interlaced media segments. In another example implementation, the associated one of the BRMs 108A-N then performs transcoding, trans-scaling, and/or trans-rating of the media segments.

Furthermore, the associated one of the upload modules 110A-N uploads and synchronizes the media segments to the cloud based media service 104 via the associated one of the cloud based sharing services 112A-N. The upload can start as soon as the media segments starts becoming available or it can start at a later time. For example, the upload of the media segments can be pipelined with the bandwidth reduction process to minimize the latency incurred. For example, the associated one of the upload modules 110A-N uploads the media segments based on parameters including bandwidth available for the upload, live or stored processing requirements, end-user experience requirement, and the like.

In one example implementation, the associated one of the upload modules 110A-N uploads and synchronizes the encoded media segments, the converted media segments, the scaled media segments or the transcoded, trans-scaled or trans-rated media segments to the cloud based media service 104 via the associated one of the cloud based sharing services 112A-N. In another example implementation, the associated one of the BRMs 108A-N encrypts the media segments. The associated one of the upload modules 110A-N then uploads and synchronizes the encrypted media segments to the cloud based media service 104 via the associated one of the cloud based sharing services 112A-N. In one example, the associated one of the BRMs 108A-N extracts analytics, such as recognizable face and runs the key word spotting types of analytics. Such analytics can be used to better tag the media content for easy indexing/retrieval. The associated one of the upload modules 110A-N then uploads the analytics information to the cloud based media service 104 and the cloud based media service 104 then process and sends a dashboard to the client devices 106A-N.

In addition, the cloud based media service 104 stores the received media segments in the cloud storage 114 for real-time streaming, non real-time streaming, social sharing or online sharing. Moreover, the cloud based media service 104 sends the media segments to the client devices 106A-N (e.g., smart phones, tablets, laptops, and so on). In one example implementation, the intelligent media transcoder 116 transcodes the media segments to one or more forms based on the resolution, frame-rate, and/or bit-rate requirements of the client devices 106A-N. For example, the transcoding may be for adaptive bit-rate streaming using techniques, such as a dynamic adaptive streaming over hypertext transfer protocol (MPEG-DASH), HTTP live streaming (HLS), smooth streaming, HTTP dynamic streaming, and so on.

In an example, the intelligent media transcoder 116 mixes the media segments sent by two or more electronic devices (e.g., the electronic devices 102A and 102N) and streams the mixed media segments to the client devices 106A-N for social sharing, online sharing, real-time processing, non real-time processing and the like when the two or more electronic devices are capturing or recording the same media content. For example, when two electronic devices are capturing media content associated with an event in different angles or positions, each of the two electronic devices partitions the associated captured media content into multiple media segments. For example, if the media content is of 300 MB and time is 3 minutes. The electronic devices then partition the media content of 300 MB to media segments of 100 MB each. In an embodiment, the electronic devices then compress the media segments of 100 MB to 10 MB. Further, the electronic devices upload the media segments or the compressed media segments to the cloud based media service via the associated cloud based sharing service. Furthermore, the cloud based media service mixes the media segments or uses the media segment uploaded by one electronic device while the other electronic device is preparing the media segment for upload or uploading the media content for sending the media segments to the client devices for online sharing, social sharing, real-time processing or non real-time processing.

Figure 2:
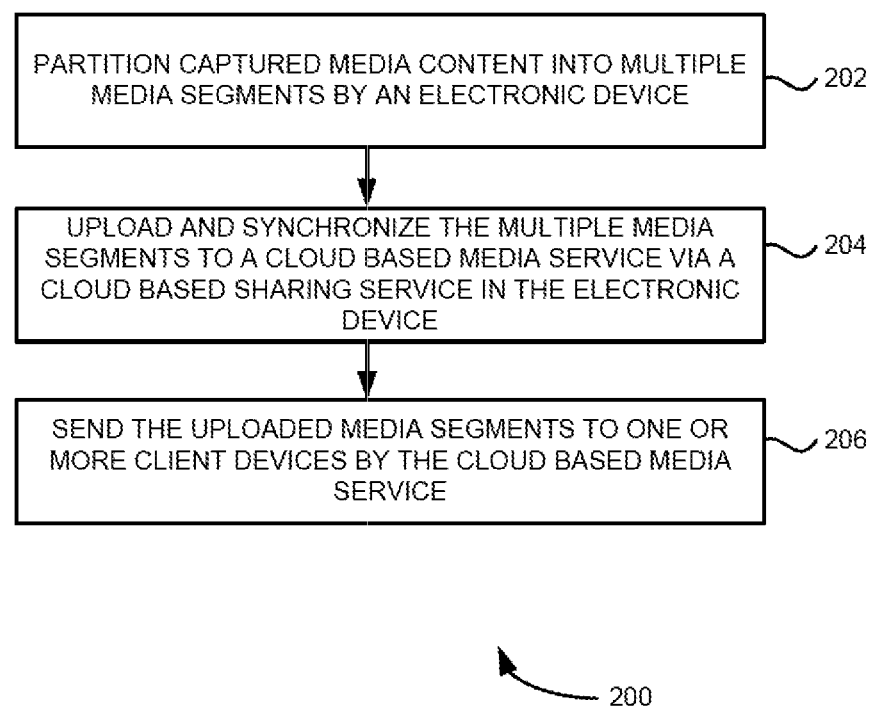
FIG. 2 illustrates a flow diagram of a method for upload and synchronization of media content to a cloud based media service, according to one embodiment.

FIG. 2 illustrates a flow diagram 200 of a method for upload and synchronization of media content to a cloud based media service, according to one embodiment. For example, the media content includes audio streams, speech, images, video streams, graphics and the like and the cloud based media service includes a cloud based media locker service, an online video transcoding service, a cloud based media hosting service and the like.

At block 202, the media content is partitioned into multiple media segments by an electronic device. The media content is captured by the electronic device. For example, the electronic device includes a tablet, a smart phone, a personal computer, a camera, a laptop and the like. In one embodiment, the media content is partitioned into the multiple media segments based on parameters including duplication of media content, a size of media content allowed for available bandwidth in cellular or wireless networks, scene transition, location based information, media content where there is no motion and the like.

At block 204, the media segments are uploaded and synchronized to a cloud based media service via a cloud based sharing service in the electronic device. For example, the media segments are uploaded based on parameters including bandwidth available for the upload, live or stored processing requirements, end-user experience requirement, and the like. In one example embodiment, the media segments are encoded and then uploaded and synchronized to the cloud based media service by the electronic device.

In another example embodiment, the media segments are converted into a lower bit-rate coded representation and then the converted media segments are uploaded and synchronized to the cloud based media service by the electronic device. For example, the lower bit-rate coded representation is a scalably coded representation including a plurality of media resolutions and/or a plurality of bit-rates. In this example embodiment, the media segments are converted to the lower bit-rate coded representation using processing steps including processing the media segments and/or transcoding the media segments. In an example implementation, the media segments are converted into the lower bit-rate coded representation based on parameters, such as properties of the media segment, bandwidth available for the upload, computing capabilities of an electronic device, power and battery life requirements of an electronic device, cloud based media service requirement, live or stored processing requirement, end-user experience requirement, and the like. At block 206, the media segments are sent to one or more client devices by the cloud based media service. This is explained in more detail with reference to FIG. 1.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In various embodiments, the systems and methods described in FIGS. 1 through 2 propose an efficient technique for upload and synchronization of media content to cloud based media services. The technique partitions the media content into multiple media segments and uploads and synchronizes the media segments to the cloud based media service via a cloud based sharing service in the electronic device. Therefore, the present technique reduces the cost of upload, the computation cost in the cloud based media service, and storage requirements in the cloud based media service. Further, the above technique provides the media content seamlessly to end-users and enhances user experience of the end-users.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for upload and synchronization of media content to a cloud, comprising:
   capturing live media content by an electronic device having imaging or recording capability;
   partitioning the live media content into multiple media segments by the electronic device that is used to capture the live media content based on logical cue points, size of media content allowed for upload, location-based information, and scene transition prior to transcoding the live media content, wherein the location-bused information comprises information related to contents being watched by end-users at a particular time;
   transcoding the multiple media segments into a lower bit-rate coded representation by the electronic device that is used to capture the live media content; and
   uploading and synchronizing the transcoded multiple media segments corresponding to the lower bit-rate coded representation to the cloud for distributing to end-users via a cloud based sharing service in the electronic device.

2. The method of claim 1, further comprising:
   sending the multiple media segments to at least one of client devices by the cloud.

3. The method of claim 1, wherein transcoding the multiple media segments into the lower bit-rate coded representation by the electronic device, comprising:
   encoding the multiple media segments by the electronic device.

4. The method of claim 1, wherein the multiple media segments are transcoded into the lower bit-rate coded representation based on parameters selected from the group consisting of properties of the media segment, bandwidth available for the upload, computing capabilities of the electronic device, power and battery life requirements of the electronic device, cloud requirement, live or stored processing requirement, and end-user experience requirement.

5. The method of claim 1, wherein the lower bit-rate coded representation is a scalably coded representation comprising a plurality of media resolutions and/or a plurality of bit-rates.

6. The method of claim 1, wherein the multiple media segments are uploaded to the cloud based on parameters selected from the group consisting of bandwidth available for the upload, live or stored processing requirements and end-user experience requirement.

7. The method of claim 1, wherein the captured media content is partitioned into the multiple media segments based on parameters selected from the group consisting of duplication of media content and media content where there is no motion.

8. The method of claim 1, wherein the media content includes audio streams, speech, images, video streams and graphics, wherein the electronic device is selected from the group consisting of a tablet, a smart phone, a personal computer, a camera and a laptop and wherein the cloud based sharing service comprises a network file storage service.

9. A system, comprising:
   an electronic device having imaging or recording capability; and
   a cloud, wherein the electronic device comprises a bandwidth reduction module (BRM), a cloud based sharing service and an upload module,
   wherein the electronic device captures live media content, wherein the BRM partitions the live media content into multiple media segments based on logical cue points, size of media content allowed for upload, location-based information, and scene transition, wherein the location-based information comprises information related to contents being watched by end-users at a particular time, and transcodes the multiple media segments into a lower bit-rate coded representation and wherein the upload module uploads and synchronizes the transcoded multiple media segments corresponding to the lower bitrate coded representation to the cloud for distributing to end-users via the cloud based sharing service.

10. The system of claim 9, further comprising:
    at least one of client devices communicatively coupled to the cloud, wherein the cloud is configured to send the multiple media segments to the at least one of client devices.

11. The system of claim 9, wherein the media content includes audio streams, speech, images, video streams and graphics, wherein the electronic device is selected from the group consisting of a tablet, a smart phone, a personal computer, a camera and a laptop and wherein the cloud based sharing service comprises a network file storage service.

12. A non-transitory computer-readable storage medium having instructions that when executed by a computing device, cause the computing device to:
    capture live media content by an electronic device having imaging or recording capability;
    partition the live media content into multiple media segments by the electronic device that is used to capture the live media content based on logical cue points, size of media content allowed for upload, location-based information, and scene transition prior to transcoding the live media content, wherein the location-based information comprises information related to contents being watched by end-users at a particular time;
    transcode the multiple media segments into a lower bit-rate coded representation by the electronic device that is used to capture the live media content; and upload and synchronize the transcoded multiple media segments corresponding to the lower bit-rate coded representation to a cloud for distributing to end-users via a cloud based sharing service in the electronic device.

13. The non-transitory computer-readable storage medium of claim 12, further comprising:
   send the multiple media segments to at least one of client devices by the cloud.

14. The non-transitory computer-readable storage medium of claim 12, wherein the media content includes audio streams, speech, images, video streams and graphics, wherein the electronic device is selected from the group consisting of a tablet, a smart phone, a personal computer, a camera and a laptop and wherein the cloud based sharing service comprises a network file storage service.

* * * * *